(12) United States Patent
Ho et al.

(10) Patent No.: US 12,212,081 B2
(45) Date of Patent: Jan. 28, 2025

(54) MUTUAL INDUCTANCE TUNING COIL FOR USE WITH INFORMATION HANDLING SYSTEMS

(71) Applicant: Dell Products L.P., Round Rock, TX (US)

(72) Inventors: Kun-Da Ho, Taipei (TW); Shang-Chu Chien, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 17/700,607

(22) Filed: Mar. 22, 2022

(65) Prior Publication Data

US 2023/0318181 A1 Oct. 5, 2023

(51) Int. Cl.
*H01Q 1/22* (2006.01)
*H01Q 7/00* (2006.01)

(52) U.S. Cl.
CPC ............. *H01Q 7/00* (2013.01); *H01Q 1/2266* (2013.01)

(58) Field of Classification Search
CPC ....... H01Q 7/00; H01Q 1/2266; H04B 5/0081
See application file for complete search history.

(56) References Cited

U.S. PATENT DOCUMENTS

| 2008/0024381 | A1* | 1/2008 | Vendik | H01Q 7/00 343/822 |
| 2010/0309068 | A1* | 12/2010 | Duron | H01Q 7/00 343/730 |
| 2014/0002225 | A1* | 1/2014 | Konanur | H01Q 1/2266 336/200 |
| 2015/0214620 | A1* | 7/2015 | Yosui | H01Q 1/243 343/702 |
| 2016/0218777 | A1* | 7/2016 | Konanur | H01Q 7/00 |
| 2017/0338562 | A1* | 11/2017 | Ozenne | H01Q 1/2225 |
| 2019/0288545 | A1* | 9/2019 | Konanur | H01Q 3/24 |
| 2020/0192438 | A1* | 6/2020 | Chang | H01Q 1/521 |

* cited by examiner

*Primary Examiner* — Hai V Tran
*Assistant Examiner* — Michael M Bouizza
(74) *Attorney, Agent, or Firm* — Terrile, Cannatti & Chambers, LLP; Stephen A. Terrile (57) ABSTRACT

A mutual inductance tuning coil component which includes a substrate; and, a loop antenna mounted on the substrate, the loop antenna being positioned proximate to a Near Field Communication (NFC) radiating component of an information handling system, the loop antenna compensating for the radiated energy generated by the NFC radiating component.

18 Claims, 9 Drawing Sheets

| PARAMETER | SYSTEM 1 | SYSTEM 2 |
|---|---|---|
| R/W RESONANT FREQUENCY (MHz) | 12.8 | 13.55 |
| FIELD STRENGTH MEASUREMENTS (A/m) | | |
| DISTANCE FROM LANDING PLANE | ON-AXIS TO ANTENNA | ON-AXIS TO ANTENNA |
| 0mm | 3 | 5 |
| 5mm | 3.3 | 5.5 |
| 10mm | 3.2 | 5.5 |
| 15mm | 2.7 | 4.8 |
| 20mm | 2.1 | 4 |
| 25mm | 1.6 | 3 |
| 30mm | 1.3 | 2.2 |
| NFC TAGS DETECTION DISTANCE | | |
| TYPE 1 | 30 | 42 |
| TYPE 2 | 26 | 40 |
| TYPE 3 | 16 | 37 |
| TYPE 4 | 11 | 27 |

MUTUAL INDUCTANCE TUNING COIL FOR USE WITH INFORMATION HANDLING SYSTEMS

BACKGROUND OF THE INVENTION

Field of the Invention

The present invention relates to information handling systems. More specifically, embodiments of the invention relate to a mutual inductance tuning coil for use with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a mutual inductance tuning coil component, comprising: a substrate; and, a loop antenna mounted on the substrate, the loop antenna being positioned proximate to a Near Field Communication (NFC) radiating component of an information handling system, the loop antenna compensating for the radiated energy generated by the NFC radiating component.

In another embodiment the invention relates to a main housing portion of an information handling system, comprising: a top cover portion; a bottom cover portion coupled to the top cover portion; and, a trackpad system, the trackpad system comprising a mutual inductance tuning coil component, comprising: a substrate; and, a loop antenna mounted on the substrate, the loop antenna being positioned proximate to a Near Field Communication (NFC) radiating component of an information handling system, the loop antenna compensating for the radiated energy generated by the NFC radiating component.

In another embodiment the invention relates to an information handling system comprising: a processor; a data bus coupled to the processor; and an information handling system chassis housing, the housing comprising a base chassis, the base chassis housing the processor, the base chassis comprising a top cover portion; a bottom cover portion coupled to the top cover portion; and, a trackpad system, the trackpad system comprising a mutual inductance tuning coil component, comprising: a substrate; and, a loop antenna mounted on the substrate, the loop antenna being positioned proximate to a Near Field Communication (NFC) radiating component of an information handling system, the loop antenna compensating for the radiated energy generated by the NFC radiating component.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that Near Field Communication (NFC) generally refers to a set of communication protocols between two devices used in proximity (e.g., approximately 4-5 cm or less). NFC provides low speed wireless connections for document identity, keycards, payment, security, etc. When used with portable type information handling systems, NFC antennas are typically positioned within the palmrest or the clickpad regions of the information handling system. Various aspects of the present disclosure include an appreciation that the antennas used for NFC often include an inductive coil matched to the operating frequency (e.g., 13.56 MHz). Various aspects of the present disclosure include an appreciation that, like many antennas, the NFC antenna coil can be susceptible to its environment. The NFC antenna is often detuned and its characteristics altered when different parts or different sourced common components are placed in proximity of the antenna. Detuning of the NFC antenna can require the antenna to be retuned.

Accordingly, an NFC antenna is disclosed which overcomes the requirement of custom designed solutions for different parts or environments thus resulting in greater part reuse. Additionally, an NFC antenna is disclosed which may be used across multiple systems, thereby providing a cost benefit and stock keeping unit (sku) reduction. More specifically, a mutual inductance tuning coil is disclosed which compensates for an inductance offset thereby negating the effects of the surrounding components while using a common antenna solution. In various embodiments, the mutual inductance tuning coil allows a common NFC type antenna to be reused in different design environments. In various embodiments, the mutual inductance tuning coil provides a dual coil NFC type antenna tuning methodology which addresses challenging design environments (e.g., a crowded platform design with metal and magnetic material such as battery and printed circuit board proximate to the NFC antenna). In various embodiments, the mutual inductance tuning coil boost antenna performance by providing a dual coil design approach.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
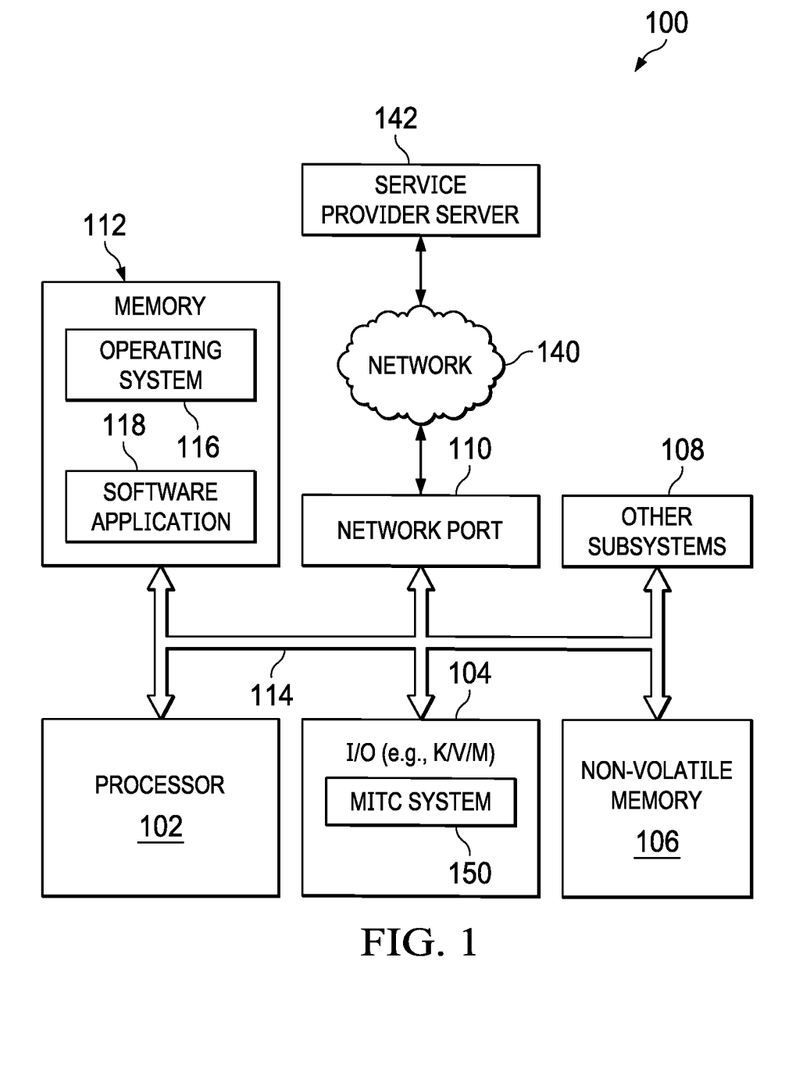
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

In certain embodiments, the input/output devices 104 include a mutual inductance tuning coil (MITC) system 150. In various embodiments, the mutual inductance tuning coil system 150 compensates for inductance offset (such as that generated by an NFC antenna) to negate the effects of the surrounding components while allowing a common antenna solution.

Figure 2:
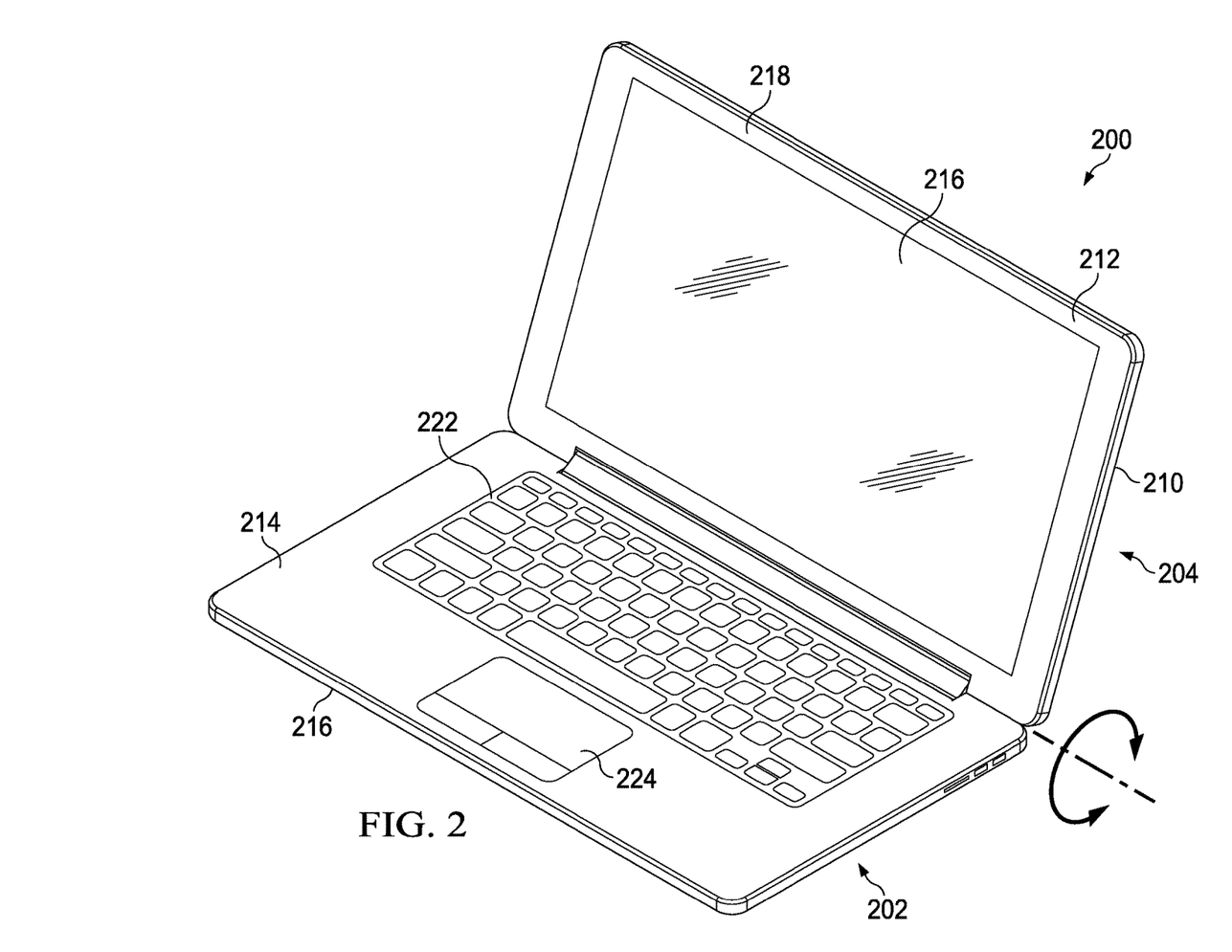
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 210 forms a top outer protective shell, or a portion of a lid, for the information handling system 200, while the D-cover 216 forms a bottom outer protective shell, or a portion of a base, for the information handling system. When in the fully closed configuration, the A-cover 210 and the D-cover 216 would be substantially parallel to one another.

In some embodiments, both the A-cover 210 and the D-cover 216 may be comprised entirely of metal. In some embodiments, the A-cover 210 and D-cover 216 may include both metallic and plastic components. For example, plastic components that are radio-frequency (RF) transparent may be used to form a portion of the C-cover 214.

In various embodiments, the display chassis 204 may be movably connected to a back edge of the base chassis 202 via one or more hinges. In this configuration, the hinges allow the display chassis 204 to rotate from and to the base chassis 202 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the display chassis 204 with regard to the base chassis 202, for example up to 180° rotation arc. In other embodiments the information handling system 200 may be a convertible information handling system with full rotation to a tablet configuration.

Figure 3:
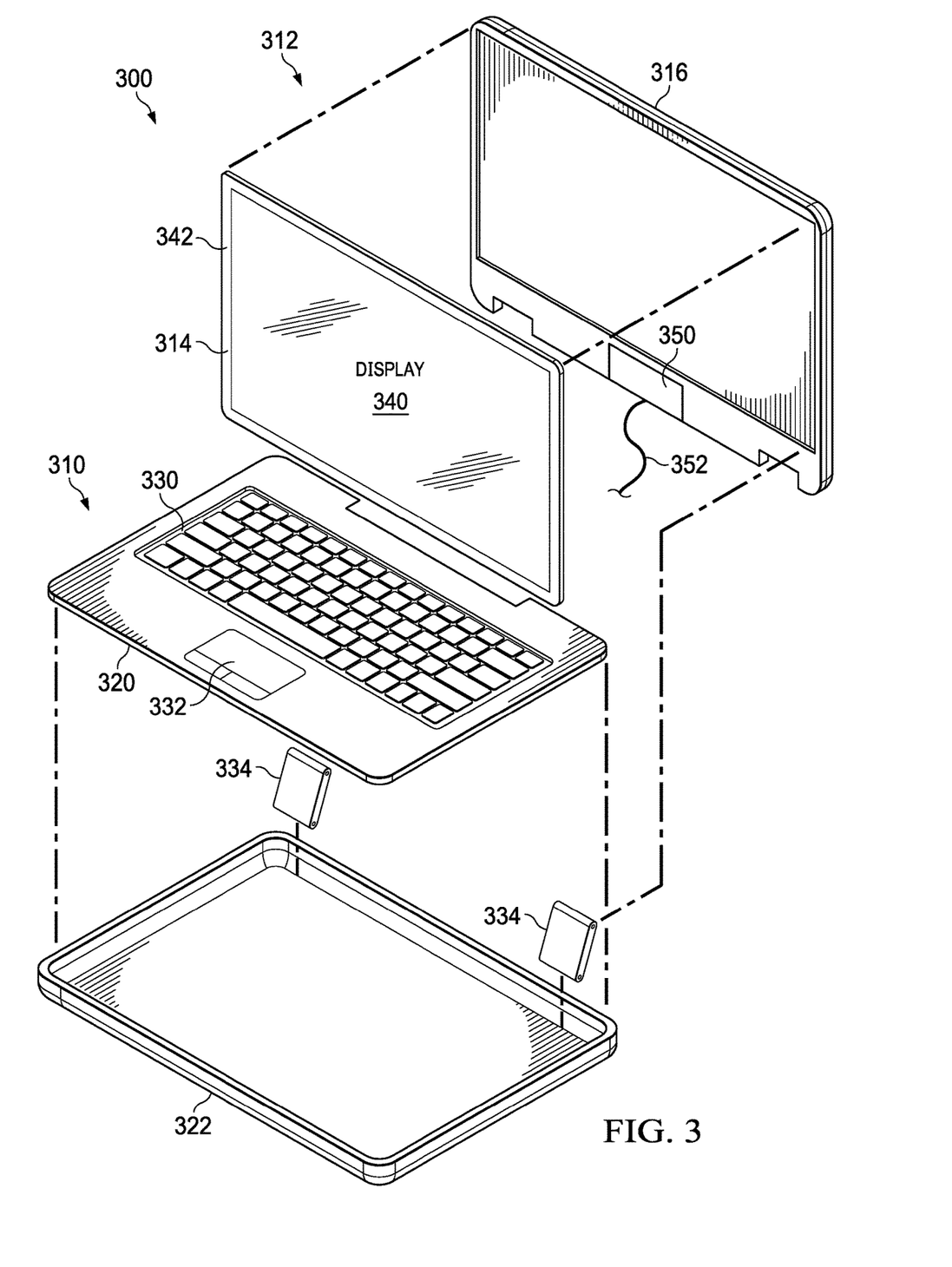
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 212) and a rear display cover portion 316 (which includes the A-Cover 210). The top cover portion 320 may include an integrated keyboard 330 or other I/O devices, such as a trackpad 332 or microphone (not shown). In various embodiments, the keyboard 330 may be mounted to the top of the C-Cover of the main housing portion 310. In various embodiments, the keyboard 330 may be mounted to the underside of the C-Cover of the main housing portion 310.

Lid housing portion 312 is rotationally coupled to main housing portion 310 via at least one hinge assembly 334. Lid housing portion 312 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 312 such that bezel may be narrow in size (e.g., less than 10 millimeters) on the edges. For example, display 340 is an infinity display with narrow bezels on the top and sides of lid housing portion 312 in the embodiment shown in FIG. 3. In certain embodiments, the side bezel is less than 4 mm (+/−10%) and the top bezel is less than 6 mm (+/−10%).

Lid housing portion 312 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 312 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
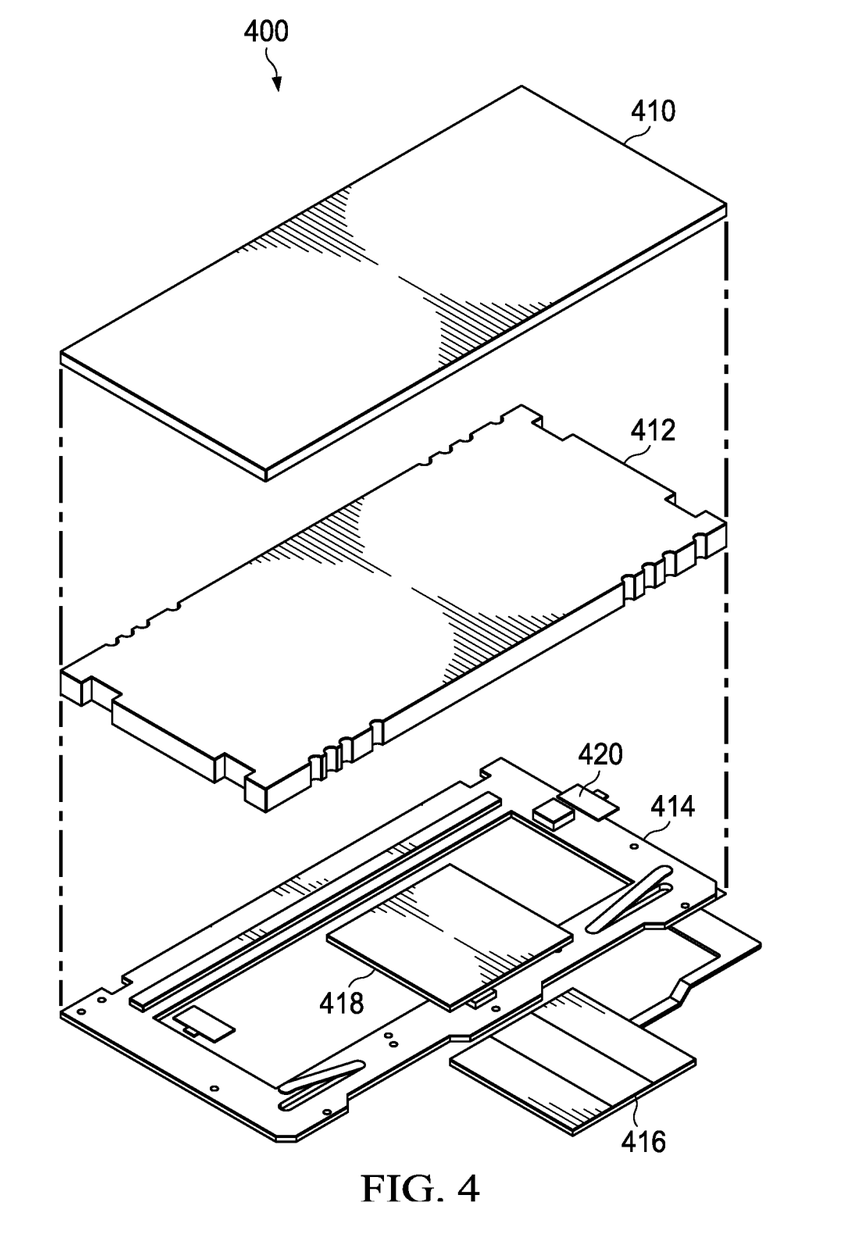
FIG. 4 shows an exploded view of a mutual inductance tuning coil system.

FIG. 4 shows an exploded view of a trackpad system 400 which includes a mutual inductance tuning coil system. In various embodiments, the trackpad system 400 includes a touchpad component 410, a printed circuit board 412, a frame 414, an NFC antenna component 416 and a mutual inductance tuning coil component 418. In various embodiments, the trackpad system 400 includes a bracket 420. In various embodiments, the touchpad component 410 is made from glass like Mylar. In various embodiments, the printed circuit board 412 includes the electronics for controlling the touchpad. In various embodiments, the printed circuit board 412 is configured as a flexible printed circuit (FPC). In various embodiments, the printed circuit board 412 includes the electronics for interacting with one or more of the touchpad component 410, the NFC antenna component 416 and the mutual inductance tuning coil component 418. In various embodiments, the frame is made from metal. In various embodiments, one or more of the printed circuit board component 412 and the mutual inductance tuning coil component 418 are mounted to the frame 414. In various embodiments, the trackpad system 400 is available under a single stock keeping unit. In various embodiments, the various components of the trackpad system 400 are integrated within a single system. In various embodiments, the various components of the trackpad system 400 are available from a single supplier or vendor.

Figure 5A:
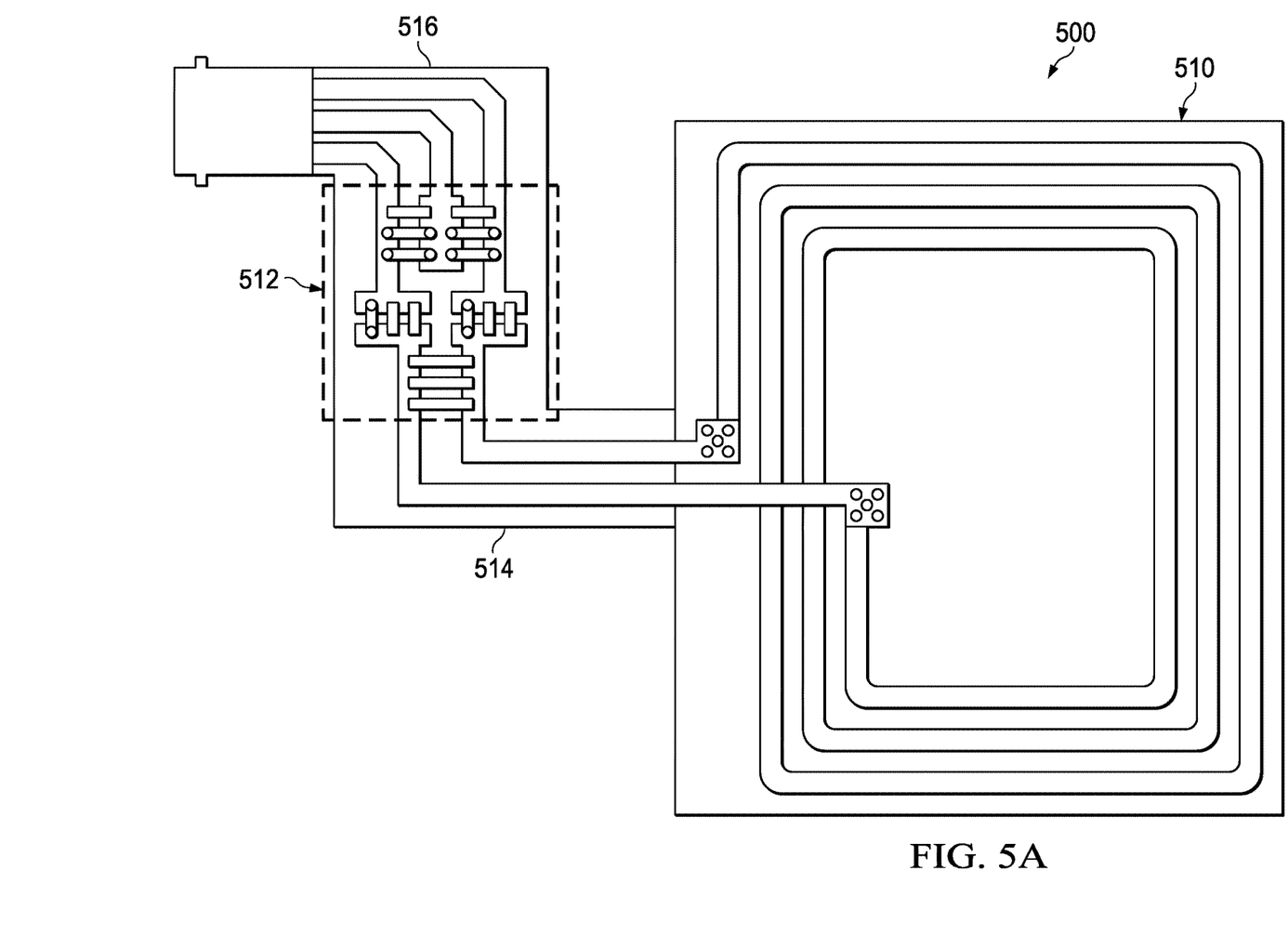
FIG. 5A shows a top view of an NFC antenna component.

FIG. 5A shows a top view of an NFC antenna component 500 and FIG. 5B shows a top view of a mutual inductance tuning coil component 502. In various embodiments, the NFC antenna component 500 includes an antenna 510, a matching circuit 512, an electrical connection portion 514 and a connector portion 516. In various embodiments, one or more of the antenna 510, the matching circuit 512, the electrical connection portion 514 and the connector portion 516 are mounted on a substrate. In various embodiments, the antenna 510 is configured as a loop antenna. In various embodiments, the loop antenna includes a plurality of concentric loops. In various embodiments, the loop antenna includes three concentric loops. In various embodiments, the number of concentric loops and the trace width of the loops are a matter of design choice based upon the environment in which the NFC antenna component 500 is included. In various embodiments, the matching circuit 512 is electrically coupled to the antenna 510 via the electrical connection portion 514. In various embodiments, one electrical trace of the electrical connection portion 514 is coupled to one end of the antenna 510 and another electrical trace of the electrical connection portion 514 is coupled to another end of the antenna 510.

Figure 5B:
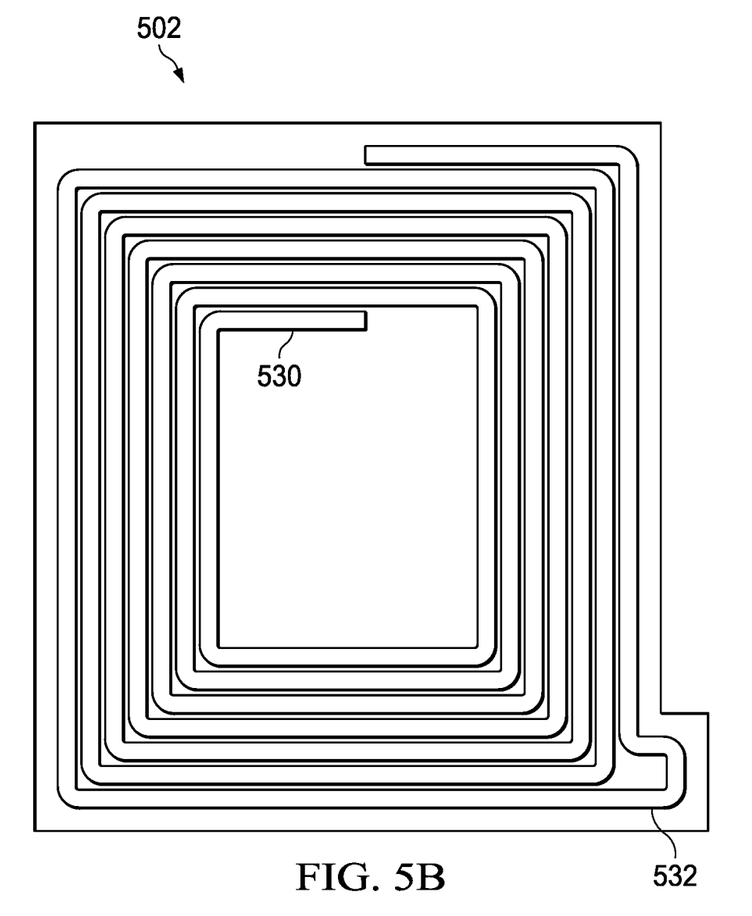
FIG. 5B shows a top view of a mutual inductance tuning coil component.

In various embodiments, the MITC component 502 includes an antenna 530. In various embodiments, the antenna 530 is mounted on a substrate. In various embodiments, the antenna 530 is configured as a loop antenna. In various embodiments, the loop antenna includes a plurality of concentric loops. In various embodiments, the loop antenna includes seven concentric loops. In various embodiments, the number of concentric loops and the trace width of the loops are a matter of design choice based upon the environment in which the MITC component 502 is included. In various embodiments, the antenna 530 include a protrusion 532. In various embodiments, the protrusion 532 is positioned on the outermost loop of the plurality of concentric loops. In various embodiments, the protrusion 532 provides a connection for tuning one or both of the inductance and the capacitance of the MITC component. In various embodiments, one or more electrical components may be coupled with the protrusion 532. In various embodiments, the one or more electrical components control the inductance and the capacitance of the MITC component. In various embodiments, the one or more electrical components include one or more of a capacitor and an inductor. In various embodiments, the configuration of the concentric loops and the electrical components are configured to interact with the antenna component 500 the shift the overall NFC antenna frequency response to substantially (i.e., +/−20%) 13.56 MHz.

In various embodiments, the resonant frequency of the mutual inductance tuning coil component 502 is determined by circuit inductance and capacitance. Specifically, in certain embodiments, the resonant frequency of the mutual inductance coil component 502 is calculated as:

$$f = \frac{1}{2\pi\sqrt{LC}}$$

In various embodiments, the target resonant frequency of the NFC antenna is substantially (e.g., +/−20%) 13.56 MHz. In various embodiments, the capacitance of the NFC antenna component 500 is determined by the matching circuit 512 of the loop antenna. In various embodiments, the total inductance of the mutual inductance tuning component 502 is determined by the loop antenna layout design and the environment mutual inductance. In various embodiments, the environment mutual inductance varies due to different information handling system configurations or multiple source (trackpad (TP), Battery, HDD, etc.). It will be appreciated that known NFC designs are not able to be used in different information handling system configurations whereas the disclosed mutual inductance tuning component 502 is designed to tune the mutual inductance effect to allow a common NFC antenna to be used with a plurality of information handling system configurations.

For example, a total inductance for a touchpad component may be set forth as:

$$L_{(total)} = L_{(loop)} + L_{(TP)}.$$

One goal of the mutual inductance tuning component 502 is to keep the total inductance ($L_{(total)}$) generally the same for different touchpads. Additionally, the inductance of the loop antenna ($L_{(loop)}$) is also consistent. Accordingly, the trackpad inductance ($L_{(TP)}$ is varied with different trackpad designs, so $$L_{(TP1)} \neq L_{(TP2)}.$$

Accordingly, the mutual inductance tuning component 502 is configured such that:

$$L_{(TP1)} = L_{(TP2)} + L_{(MITC)}.$$

Accordingly, the mutual inductance tuning component 502 tunes the mutual inductance effect to allow a common NFC antenna to be used with a plurality of information handling system trackpad configurations.

Figure 6:
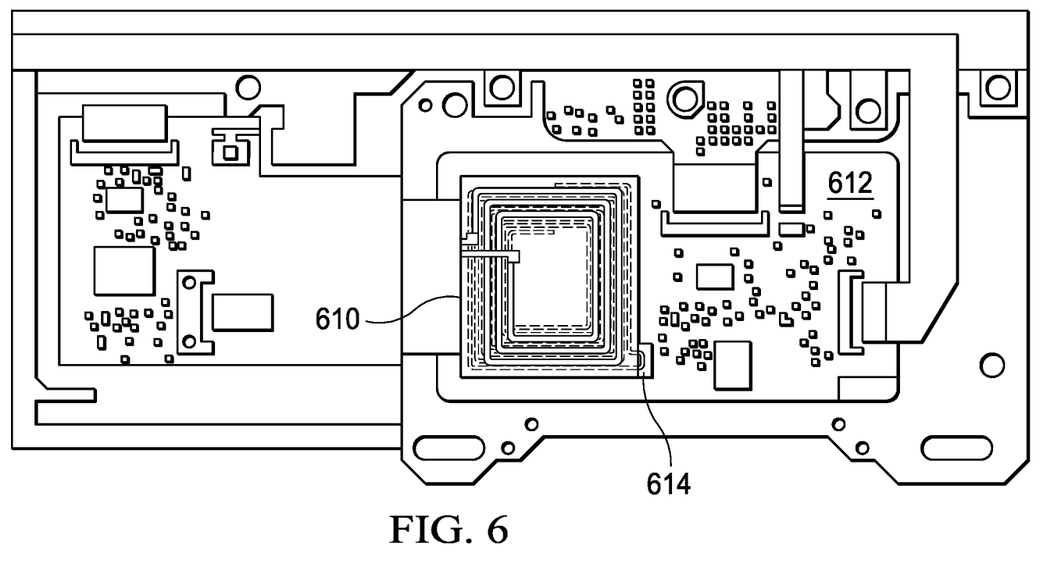
FIG. 6 shows a top view of a mutual inductance tuning coil system integrated with a flexible printed circuit.

FIG. 6 shows a top view of a mutual inductance tuning coil system integrated with a flexible printed circuit. The mutual inductance tuning coil component 610 is configured with a printed circuit board 612 such as a clickpad printed circuit board to provide a system such as a trackpad or clickpad system. In certain embodiments, the printed circuit board includes an NFC antenna. In certain embodiments, the NFC antenna 614 is proximate to the printed circuit board 612.

Figure 7:
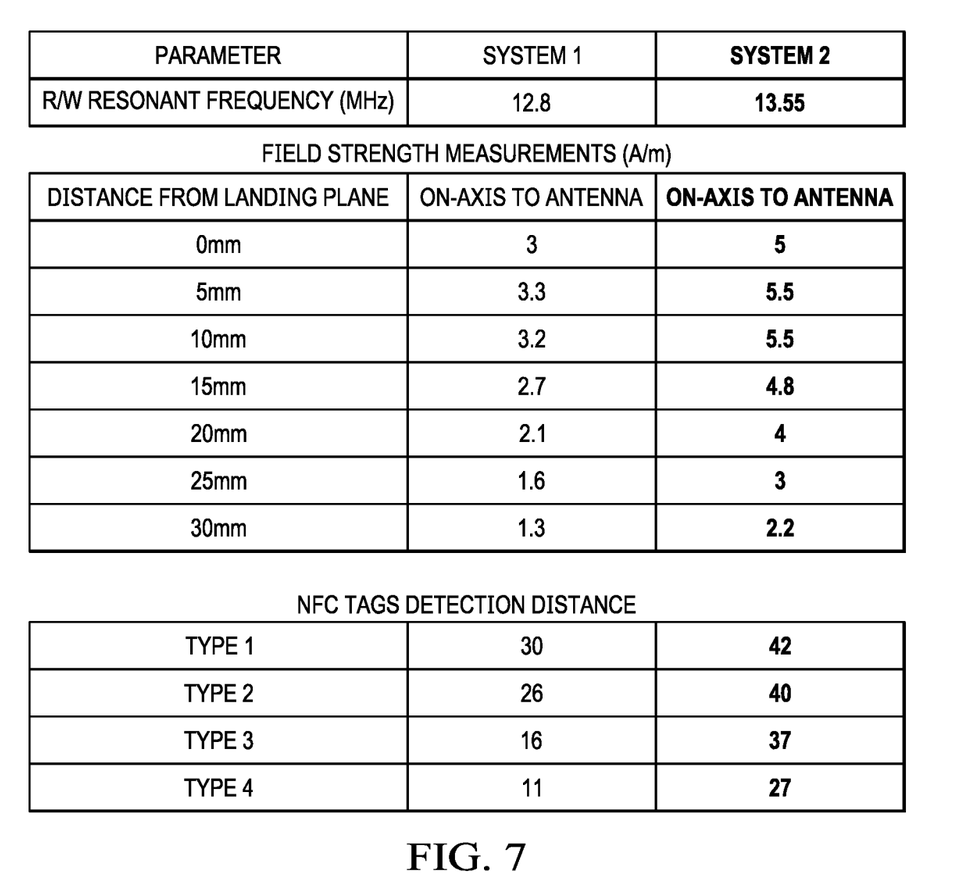
FIG. 7 shows example NFC performance values of a known system and a system incorporating a mutual inductance tuning coil system.

FIG. 7 shows example NFC performance values 700 of a known system (system 1) and a system incorporating a mutual inductance tuning coil system (system 2). For example, with the known system the NFC antenna is configured to have the resonant frequency of substantially 13.56 MHz. The NFC performance values represent field strength test values and NFC tag detection performance for a system which does not include a mutual inductance tuning coil (e.g., system 1) and a system which includes a mutual inductance tuning coil (e.g., system 2).

Figure 8:
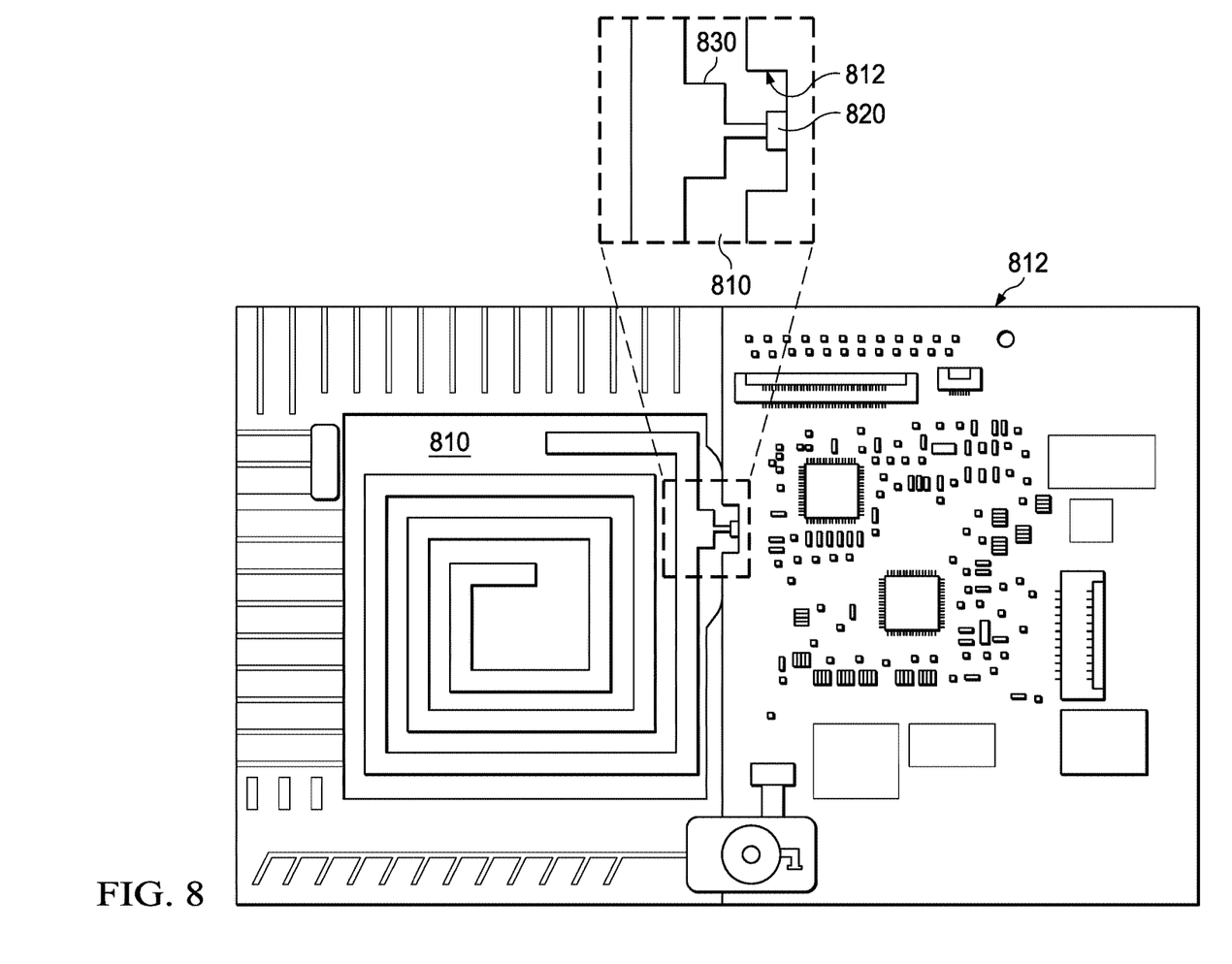
FIG. 8 shows a top view of a printed circuit board having an integrated mutual inductance tuning coil.

FIG. 8 shows a top view of a printed circuit board having an integrated mutual inductance tuning coil. The mutual inductance tuning coil component 810 is integrated with a printed circuit board 812 such as a clickpad printed circuit board. For the purposes of this disclosure integrated refers to a plurality of components being contained within a single device such as the tuning coil system being contained within a single printed circuit board.

Because an integrated mutual inductance tuning coil is not as flexible to fine tuning when compared to a non-integrated configuration, an electrical component 820 (such as an inductor or capacitor) is placed in series with the loop antenna of the mutual inductance tuning coil to provide tuning of the coil. In certain embodiments, the electrical component is coupled with a protrusion 830 from the loop antenna.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A mutual inductance tuning coil component, comprising:
   a substrate;
   a loop antenna mounted on the substrate, the loop antenna being positioned proximate to a Near Field Communication (NFC) radiating component of an information handling system, the loop antenna including a protrusion positioned on an outermost loop of the loop antenna, the loop antenna compensating for the radiated energy generated by the NFC radiating component, a mutual inductance effect of the mutual inductance tuning coil being tunable to be used with a plurality of information handling system configurations, the protrusion providing a connection for tuning the mutual inductance tuning coil component; and, a matching circuit electrically coupled to the NFC radiating component, the matching circuit controlling a capacitance of the NFC radiating component.

2. The mutual inductance tuning coil component of claim 1, wherein:
the NFC radiating component comprises a loop antenna; and,
the matching circuit is electrically coupled to the loop antenna of the NFC radiating component.

3. The mutual inductance tuning coil component of claim 2, wherein:
the capacitance of the loop antenna of the NFC radiating component is controlled by the matching circuit.

4. The mutual inductance tuning coil component of claim 1, wherein:
the loop antenna of the mutual inductance tuning coil component comprises a plurality of concentric loops.

5. The mutual inductance tuning coil component of claim 1, wherein:
the loop antenna of the mutual inductance tuning coil component is contained within a trackpad system.

6. The mutual inductance tuning coil component of claim 1, wherein:
the NFC radiating component is contained within a trackpad system.

7. A main housing portion of an information handling system, comprising:
a top cover portion;
a bottom cover portion coupled to the top cover portion; and,
a trackpad system, the trackpad system comprising a mutual inductance tuning coil component, comprising:
a substrate;
a loop antenna mounted on the substrate, the loop antenna being positioned proximate to a Near Field Communication (NFC) radiating component of an information handling system, the loop antenna including a protrusion positioned on an outermost loop of the loop antenna, the loop antenna compensating for the radiated energy generated by the NFC radiating component, a mutual inductance effect of the mutual inductance tuning coil being tunable to be used with a plurality of information handling system configurations, the protrusion providing a connection for tuning the mutual inductance tuning coil component; and,
a matching circuit electrically coupled to the NFC radiating component, the matching circuit controlling a capacitance of the NFC radiating component.

8. The main housing portion of claim 7, wherein:
the NFC radiating component comprises a loop antenna; and,
the matching circuit is electrically coupled to the loop antenna of the NFC radiating component.

9. The main housing portion of claim 8, wherein:
the capacitance of the loop antenna of the NFC radiating component is controlled by the matching circuit.

10. The main housing portion of claim 7, wherein:
the loop antenna of the mutual inductance tuning coil component comprises a plurality of concentric loops.

11. The main housing portion of claim 7, wherein:
the loop antenna is integrated with the trackpad system.

12. The main housing portion of claim 7, wherein:
the NFC radiating component is integrated with the trackpad system.

13. An information handling system comprising:
a processor;
a data bus coupled to the processor; and
an information handling system chassis housing, the housing comprising a base chassis, the base chassis housing the processor, the base chassis comprising
a top cover portion;
a bottom cover portion coupled to the top cover portion; and,
a trackpad system, the trackpad system comprising a mutual inductance tuning coil component, comprising:
a substrate;
a loop antenna mounted on the substrate, the loop antenna being positioned proximate to a Near Field Communication (NFC) radiating component of an information handling system, the loop antenna including a protrusion positioned on an outermost loop of the loop antenna, the loop antenna compensating for the radiated energy generated by the NFC radiating component, a mutual inductance effect of the mutual inductance tuning coil being tunable to be used with a plurality of information handling system configurations, the protrusion providing a connection for tuning the mutual inductance tuning coil component; and,
a matching circuit electrically coupled to the NFC radiating component, the matching circuit controlling a capacitance of the NFC radiating component.

14. The information handling system of claim 13, wherein:
the NFC radiating component comprises a loop antenna; and,
the matching circuit is electrically coupled to the loop antenna of the NFC radiating element.

15. The information handling system of claim 14, wherein:
the capacitance of the loop antenna of the NFC radiating component is controlled by the matching circuit.

16. The information handling system of claim 13, wherein:
the loop antenna of the mutual inductance tuning coil component comprises a plurality of concentric loops.

17. The information handling system of claim 13, wherein:
the loop antenna of the mutual inductance tuning coil component is integrated with the trackpad system.

18. The information handling system of claim 13, wherein:
the NFC radiating component is integrated with the trackpad system.

* * * * *